(12) United States Patent  
Melzer

(10) Patent No.: US 9,860,748 B2  
(45) Date of Patent: Jan. 2, 2018

(54) AUTOMATIC COMMUNICATION PROTOCOL SELECTION FOR LIMB WORN DEVICES

(71) Applicant: Roy S. Melzer, Tel-Aviv (IL)

(72) Inventor: Roy S. Melzer, Tel-Aviv (IL)

(*) Notice: Subject to any disclaimer, the term of this patent is extended or adjusted under 35 U.S.C. 154(b) by 155 days.

(21) Appl. No.: 14/631,976

(22) Filed: Feb. 26, 2015

(65) Prior Publication Data

US 2015/0249976 A1 Sep. 3, 2015

Related U.S. Application Data

(60) Provisional application No. 61/946,945, filed on Mar. 3, 2014.

(51) Int. Cl.
| | |
|---|---|
| *H04W 72/04* | (2009.01) |
| *H04W 12/06* | (2009.01) |
| *H04W 4/02* | (2009.01) |
| *H04W 4/00* | (2009.01) |
| *H04W 4/20* | (2009.01) |

(52) U.S. Cl.
CPC .......... *H04W 12/06* (2013.01); *H04W 4/008* (2013.01); *H04W 4/025* (2013.01); *H04W 4/206* (2013.01)

(58) Field of Classification Search  
None  
See application file for complete search history.

(56) References Cited

U.S. PATENT DOCUMENTS

2009/0046677 A1* 2/2009 Toledano ............ H04L 12/5895  
370/338  
2010/0125188 A1* 5/2010 Schilling .............. A61B 5/0002  
600/336

* cited by examiner

*Primary Examiner* — Huy D Vu  
*Assistant Examiner* — Hong Shao

(57) ABSTRACT

A method of selecting a communication protocol to encode a message wirelessly transmitted from a limb worn device to a wirelessly controllable apparatus. The method comprises analyzing an output of at least one motion sensor installed in a limb worn device having an MMI to detect a human routine limb motion performed by a user wearing the limb worn device while the user operates one of a plurality of wirelessly controllable apparatuses, automatically selecting for an operation period, according to the detected human routine limb motion, one of a plurality of communication protocols, automatically detecting a user input performed by the user using the MMI during the operation period, and automatically generating and transmitting a message indicative of operation instructions to operate a function executed by a processor associated with the selected wirelessly controllable apparatus and correlated with the user input.

20 Claims, 2 Drawing Sheets

AUTOMATIC COMMUNICATION PROTOCOL SELECTION FOR LIMB WORN DEVICES

RELATED APPLICATION

This application claims the benefit of priority under 35 USC 119(e) of U.S. Provisional Patent Application No. 61/946,945 filed Mar. 3, 2014, the contents of which are incorporated herein by reference in their entirety.

BACKGROUND

The present invention, in some embodiments thereof, relates to automatic communication protocol selection and, more specifically, but not exclusively, to an automatic communication protocol selection in wearable devices.

A variety of portable user devices provide wireless network connectivity. Various features of a device often compete for space on the device. For example, the available space for a tactile interface may be sized relative to display requirements. Further, the ability to customize a device may be limited to changing display options on a fixed set of hardware associated with the device. Additionally, as technology evolves, the device may require significant modifications or complete replacement to remain relevant to the evolving technology.

SUMMARY

According to some embodiments of the present invention, there is provided a method of selecting a communication protocol to encode a message wirelessly transmitted from a limb worn device to a wirelessly controllable apparatus. The method comprises analyzing an output of at least one motion sensor installed in a limb worn device having a man machine interface (MMI) to detect a human routine limb motion performed by a user wearing the limb worn device while the user operates one of a plurality of wirelessly controllable apparatuses, automatically selecting for an operation period, according to the detected human routine limb motion, one of a plurality of communication protocols where each communication protocol from the plurality of communication protocols is set to allow the limb worn device to communicate with another of the plurality of wirelessly controllable apparatuses, automatically detecting a user input performed by the user using the MMI during the operation period, and wirelessly transmitting automatically a message indicative of operation instructions to operate a function executed by a processor associated with the selected wirelessly controllable apparatus and correlated with the user input, the to message being transmitted from the limb worn device to a first of the plurality of wirelessly controllable apparatuses which is communicated with according to the selected communication protocol.

Optionally, the method further comprises automatically adapting a user interface presented by the MMI during the operation period according to the selected communication protocol.

Optionally, the message comprises authentication data for authenticating the user.

Optionally, the operation period is shorter than 5 minutes.

Optionally, the processor is of the first wirelessly controllable apparatus.

Optionally, the processor is of an accessory of the first wirelessly controllable apparatus.

Optionally, the automatically selecting comprises disconnecting an existing communication channel which allows the limb worn device to send a second of the plurality of wirelessly controllable apparatuses messages encoded according to a second of the plurality of communication protocols and establishing a new communication channel to send the message therethrough.

More optionally, the establishing comprises automatically performing a pairing of the limb worn device with the first wirelessly controllable apparatus.

Optionally, the function is a text processing function for editing text presented on a display of the plurality of wirelessly controllable apparatuses.

Optionally, the function is a media playing operation function for controlling a playing of media content presented on a display of the first wirelessly controllable apparatus.

Optionally, the plurality of communication protocols comprises a first communication protocol to communicate with a computing unit connected to an external keyboard and a second communication protocol to communicate with a touch screen operated computing unit.

Optionally, the selected communication protocol defines instructions to send messages selected from the following messages type: keyboard input instructions, mouse input instructions, touch screen input instructions, and television remote control instructions.

Optionally, the at least one motion sensor comprises at least one of an accelerometer and a gyro.

Optionally, the limb worn device is a watch having a touch screen as the MMI; the user input is a touch event detected on the touch screen.

More optionally, the touch event is a finger touch or a finger slide on the touch screen.

Optionally, the detected human routine limb motion is typing and the message is indicative of a keyboard input to an application currently running on the first wirelessly controllable apparatus.

Optionally, the detected human routine limb motion is cursor maneuvering and the message is indicative of an editing operation to edit an object pointed by a cursor and presented by an application currently running on the first wirelessly controllable apparatus.

Optionally, the detected human routine limb motion is steering wheel maneuvering and the message is indicative of a vehicle function operation and the processor is of a system install in the first wirelessly controllable apparatus and the first wirelessly controllable apparatus is a vehicle.

Optionally, the plurality of communication protocols comprises a word processor communication protocol to communicate with a computing unit running a word processor and a cellular phone communication protocol to communicate with a cellular phone such that when the selected communication protocol is the word processor communication protocol the operation instructions instructs the word processor and when the selected communication protocol is the cellular phone communication protocol the operation instructions instructs the cellular phone to perform a wireless interpersonal communication related operation.

According to some embodiments of the present invention, there is provided a limb worn device, comprising: a housing sized and shaped to be worn by a user, at least one motion sensor mounted in the housing, a motion analysis module which analyzes outputs of the at least one motion sensor to detect a current human routine limb motion performed by the user while the user operates one of a plurality of wirelessly controllable apparatuses and automatically selects in response to the detection and according to the detected human routine limb motion one of a plurality of communication protocols where each communication protocol from the plurality of communication protocols is set to allow the limb worn device to communicate with another of the plurality of wirelessly controllable apparatuses, a man machine interface (MMI) which detects a user input performed by the user using the MMI after the motion analysis module performs the selection, and a wireless transmitter which transmits, to the first wirelessly controllable apparatus in response to the detection of the user input, a message encoded according to the selected communication protocol to indicate operation instructions to operate a function executed by a processor of a first of the plurality of wirelessly controllable apparatuses.

Optionally, the MMI is a touch screen.

According to some embodiments of the present invention, there is provided a system of establishing communication channels with different wirelessly controllable apparatuses for entering user inputs. The system comprises a housing sized and shaped to be worn by a user, at least one motion sensor mounted in the housing, a memory for storing communication instructions for communicating with a plurality of wirelessly controllable apparatuses according to a plurality of communication protocols, a motion analysis module which analyzes outputs of the at least one motion sensor to detect a human routine limb motion performed by the user while the user operates one of a plurality of wirelessly controllable apparatuses and automatically selects in response to the detection and according to the detected human routine limb motion one of the plurality of communication protocols, a man machine interface (MMI) mounted in the housing which detects a user input performed by the user using the MMI after the motion analysis module performs the selection, a message encoder which generates a message indicative of operation instructions to operate a function executed by a processor of a first of the plurality of wirelessly controllable apparatuses according to the selected communication protocol, and a wireless transmitter which transmits the message over a wireless network connection to the first wirelessly controllable apparatus in response to the detection of the user input.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
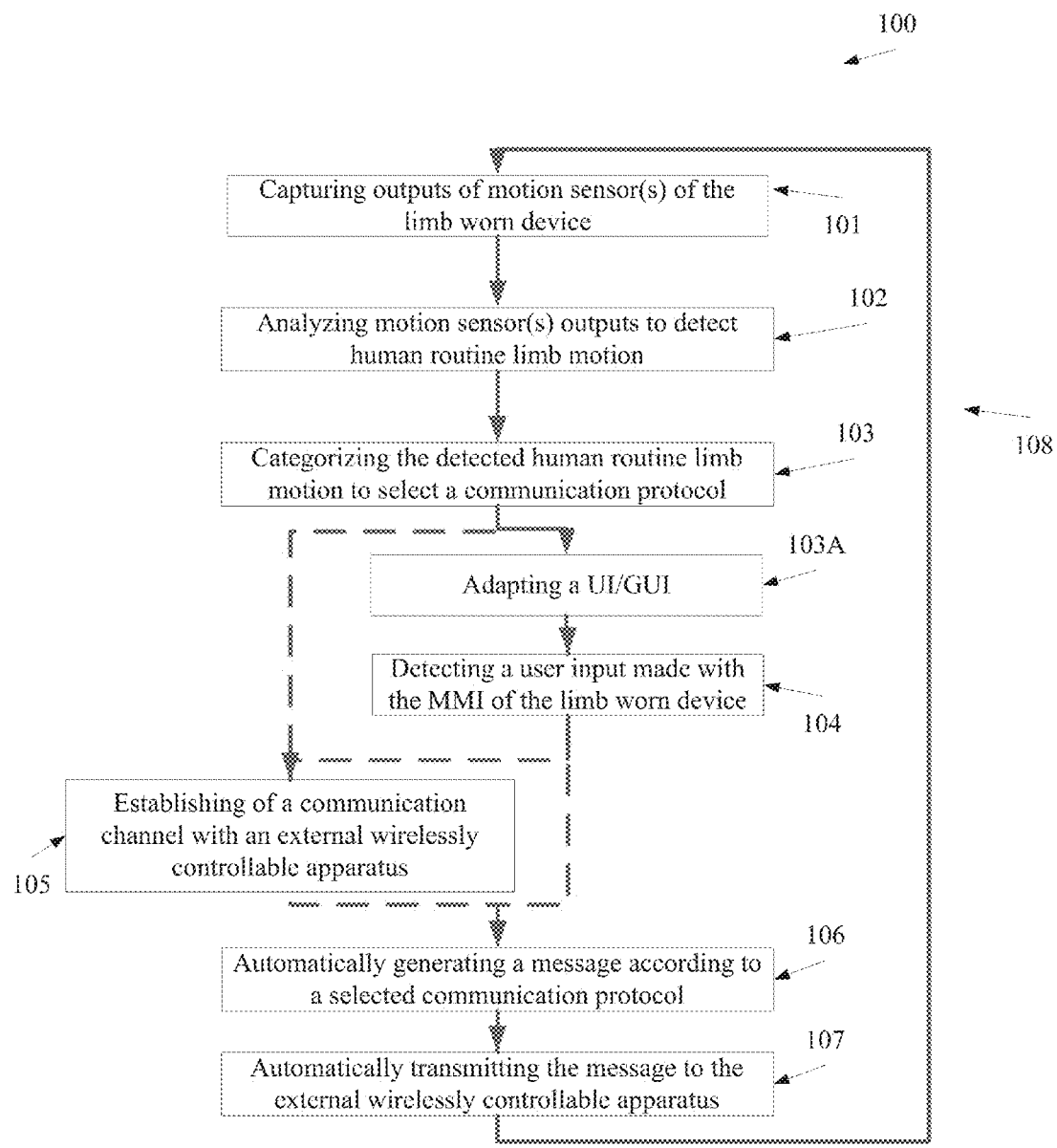
FIG. 1 is a flowchart of a process for automatically selecting a communication protocol for communication between a limb worn device and a computing unit of an external wirelessly controllable apparatus, according to some embodiments of the present invention.

The present invention, in some embodiments thereof, relates to automatic communication protocol selection and, more specifically, but not exclusively, to an automatic communication protocol selection in wearable devices.

According to some embodiments of the present invention, there are provided methods and systems of dynamically interpreting user inputs made using a MMI of a limb worn device dependent on current or recent limb movements of the user wearing the limb worn device. In use, movement pattern of the limb worn device are analyzed to identify routine human apparatus operation limb movements, such as typing, mouse maneuvering, cellular phone holding, remote control activating, touch screen sliding, touch screen typing and/or the like. Based on the identified routine human apparatus operation limb movements a communication protocol is selected, for example from a database of communication protocols. This allows, in response to the detection of a user input to the MMI, encoding a message with operation instructions which are suitable a wirelessly controllable apparatus that is currently being used by the user and/or set to support a man operated apparatus currently operated by the user.

The methods and systems allows a user to use the same user input commend, e.g. a gesture or a voice commend, for example a click of a button of a watch, a finger touch on a touch display of a watch, or a finger slide on a touch display of a watch to operate different wirelessly controllable apparatuses, optionally after automatically establishing a communication channel therewith (e.g. pairing) by automatically selecting a communication protocol to communicate with a wirelessly controllable device according to an analysis of the current or recent limb moment.

By using the above outlined methods and systems, the same user input limb worn device commend, referred to herein as a user input, may be used to input any combination of the following in different limb movement identified situations: a text editing function instructions to a word processing application running on a currently used laptop, an infotainment system operation instructions to an infotainment system of a currently driven vehicle, a messaging application operation instructions to a messaging application of a Smartphone currently used for a call, a media rendering operation (e.g. any television remote control operation) instructions to an application of a display currently presenting visual presentation to a user and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart of a process 100 for automatically selecting a communication protocol for communication between a limb worn device and a computing unit of an external wirelessly controllable apparatus, according to some embodiments of the present invention. The process 100 is optionally implemented at the limb worn device side. The process allows automatic identification of a human limb motion associated with operation(s) of a certain external wirelessly controllable apparatus, for example typical device operation movement pattern, for instance typing hand movements, mouse operating hand movements, touch screen sweeping stroke movements, and/or any hand or leg gestures which are typically performed when a user operate a distinguishable external wirelessly controllable apparatus.

As used herein a limb worn device means a Smart watch, Smart band, a wristband, with a computing element, a leg band, or any other device which is sized and shaped to be worn on a limb of a human user which operates different external wirelessly controllable apparatuses. A wirelessly controllable apparatus means any device operated according to a man machine interface and having a wireless receiver for receiving instructions from the limb worn device. For example, the wirelessly controllable apparatus may be a client terminal, such as a laptop, a personal computer, a tablet, a wearable device, such as Google GLASS™, a vehicle, a vehicle with an infotainment system, a weapon, and/or any device that is operated by limb operations of a user and/or operated when the user performs typical limb operations and has a computing unit that receives instructions forwarded from a receiver. As used herein, a communication protocol means a set of instructions for communicating with a wirelessly controllable apparatus, for example a set of messages which encode instructions to operate function(s) of the wirelessly controllable apparatus and optionally definitions and/or standards according to which a communication channel between the limb worn device and wirelessly controllable apparatus is established and/or managed, for example a Bluetooth™, Wi-Fi™, ZigBee™, and Near field communication (NFC).

Figure 2:
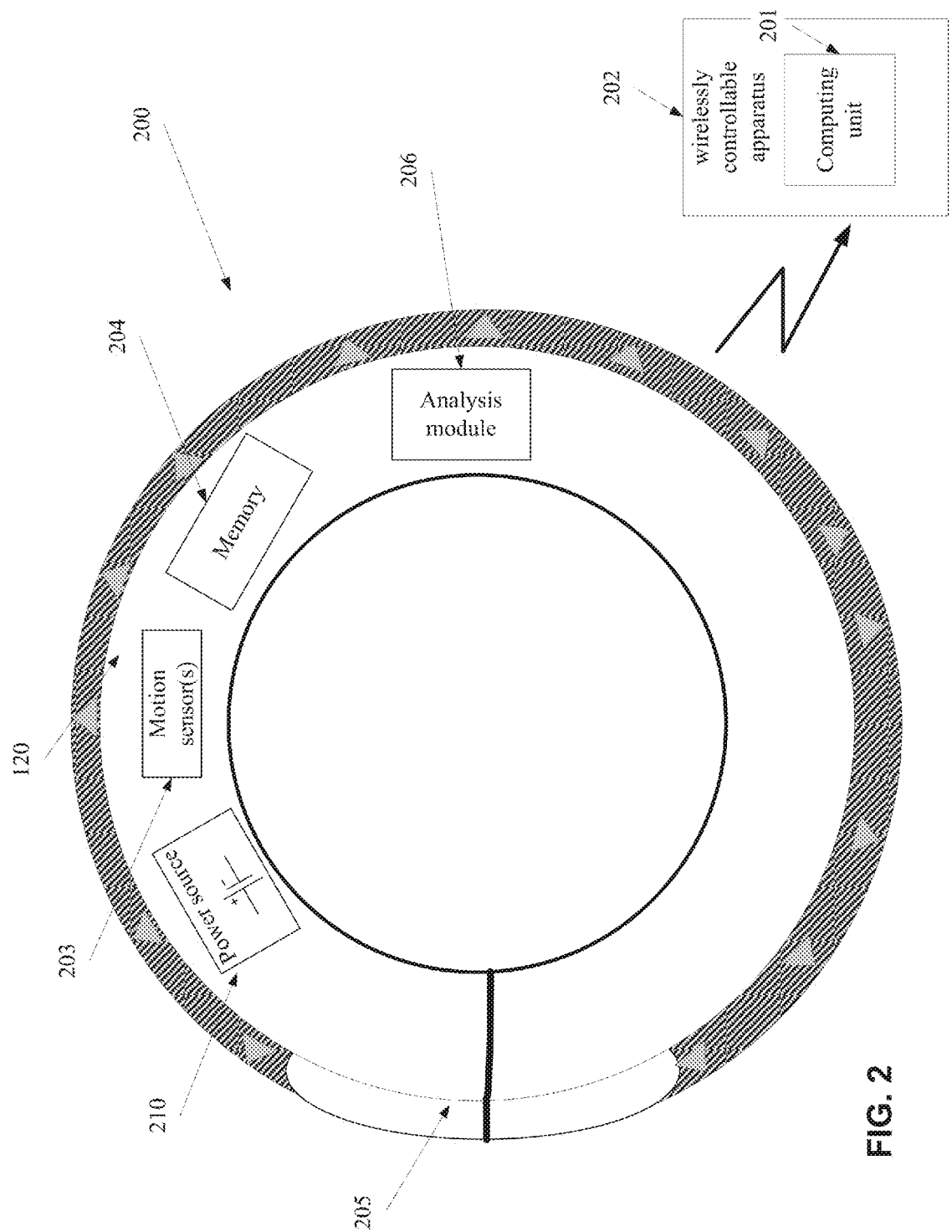
FIG. 2 is a schematic illustration of an exemplary limb worn device that automatically selects a communication protocol to communicate wirelessly with a computing unit of an external wirelessly controllable apparatus according to an analysis of current human limb motions, according to some embodiments of the present invention.

Reference s also made to FIG. 2, which is a schematic illustration of an exemplary limb worn device 200 that automatically selects a communication protocol to communicate wirelessly with a computing unit 201 of an external wirelessly controllable apparatus 202 according to an analysis of current human limb motions, according to some embodiments of the present invention. The selection is optionally performed for an operation period, for instance, 1 second, 5 seconds, 10 seconds, 1 minute, one hour, or any intermediate or longer period. Optionally, different operation periods are set for different categorizations.

The limb worn device 200 includes a MMI 205, such as a touch screen and/or one or more buttons which are set to receive user inputs. In use, as described above, the user input is translated to one or more different messages based on automatic identification of a current human limb motion that is typical to an operation of a certain external wirelessly controllable apparatus 202. For example, a press of a button or a touch screen fingertip input may be translated to instructions to perform a text editing operation when the identified human limb motion is a typing operation and translated to instructions to perform a cursor operation, such as a cursor selection or shift key selection (to change the function of a cursor selection) when the identified human limb motion is a mouse maneuvering operation and translated to instructions to perform an infotainment operation, such as mute or call answer instructions or a vehicle system function operation, such as blinking when the identified human limb motion is a steering wheel maneuvering operation.

The limb worn device 200 includes one or more motion sensors 203 for detecting limb movements, for example accelerometer(s), gyroscopic unit(s), and/or integrated camera(s) which are associated with an image processing module for detecting motion pattern(s) by performing image processing analysis.

The limb worn device 200 further includes a power source, such as a rechargeable battery and a memory 204 for storing a plurality of communication protocols, for example a plurality of communication protocol records, each includes a communication channel establishment instructions and/or indexes which correlate between user inputs made using the MMI 205 and different instructions to operate an external wirelessly controllable apparatus 202, for example currently operated wirelessly controllable apparatus and/or a remote wirelessly controllable apparatus that is associated with currently used wirelessly controllable apparatus that does not communicate with the limb worn device 200, for instance bicycle or a cane. In such a manner, external wirelessly controllable apparatus 202 functions as a support system or an accessory that supports an activity held with the currently used wirelessly controllable apparatus which the current human limb motions are indicative of usage thereof. This allows automatic selection of a communication protocol to communicate via a direct or indirect communication channel with the support system without having to select or manually activate or launch the support system. For example, a support system for a bicycle or a car may be garage door opening device or a rescue system or an operation of an add-on blinker or an add-on camera. For example, a support system for a cane may be an application in a Smartphone, such as voice controlled navigation assistance. For example, a support system for a baby trolley may be an application in a Smartphone.

The limb worn device 200 further includes an analysis module 206, such as a software application and/or a firmware that is installed on the limb worn device 200, accesses the memory 204, and receives outputs of the one or more motion sensors 203. In use, the analysis module 206 analyses the reading of the motion sensor(s) 203 to identify automatic current human limb motions and to select automatic accordingly one of the plurality of communication protocol records. The automatic selection is optionally done by matching the current human limb motions with reference patterns which are stored in the memory 204. When a reference pattern is matched, a respective communication protocol associated therewith is selected and used for translating some or all of the user inputs captured by the MMI 205.

Reference is now made, once again to FIG. 1. First, as shown at 101, output(s) of the motion sensor(s) 203 installed in the limb worn device 200 are captured, for example by the analysis module 206. Optionally, the capturing is continually performed, for example sequentially and/or iteratively during a monitoring period, for instance in certain hours of the day, upon user selection and/or when triggered by a user or function selection. This allows changing the communication protocol according to which the limb worn device 200 communicates with other devices automatically, without any user input and based on the detection of typical limb movements which are performed while the user is involved in a routine task such as typing, mouse maneuvering, finger touching on a touch screen, driving, resting, for example while watching a movie, dancing, walking, sitting, participating in a phone call while holding a handheld device, texting electronic message, such as an instant messaging (IM) message or an Short Message Service (SMS) and/or the like.

As shown at 102, the output(s) of the motion sensor(s) 203 are analyzed, optionally continuously or iteratively, to detect and categorize a detected human routine limb motion of the user who wears the limb worn device 200, as shown at 103. Optionally, the detected human routine limb motion is a movement pattern of a routine device operation movement, for instance measured during a period of at least 5 seconds, 10 seconds, 1 minute, 5 minutes, or any intermediate or longer periods. Optionally, in order to reduce false categorization of human routine limb motions, the movement pattern is a repetitive pattern that is repeated at least 2 times, 5 times, or any intermediate number of times or more frequently.

Optionally, the outputs of the motion sensor(s) 203 are matched with reference patterns where each reference pattern is associated with a different communication protocol and/or one of a plurality of wirelessly controllable apparatuses and/or one of a plurality of operation modes of a wirelessly controllable apparatus. When a matched is identified, the respective communication protocol is selected automatically, as shown at 103. A reference pattern is optionally associated with one of the communication protocols stored in the memory 104.

For example, output(s) of an accelerometer are captured and translated to movement vector(s). The movement vector(s) are matched with reference movement vector(s), each associated with a different wirelessly controllable apparatus, for example a typing reference movement vector is associated with a communication protocol to communicate with a personal computer as a keyboard, a swiping reference movement vector is associated with a communication protocol to communicate with a tablet, and a steering wheel operation reference movement vector associated with a communication protocol to communicate with an infotainment system.

Optionally, the categorization of the detected human routine limb motion is determined based on a combination of the outputs of the motion sensor(s) 203, for instance a motion pattern indicative of a typical human hand operation and the location of the limb worn device 200, for example detected by a location module (e.g. a GPS module and/or a cellular location service) installed in the limb worn device 200 and/or location of the limb worn device 200 as indicated by a paired device, such as a Smartphone or a table. In such a manner, the detection of typing operation in the office location may trigger a communication protocol which is different from the detection of typing operation at the home location or outside the office and/or home.

Optionally, the categorization of the detected human routine limb motion is determined based on a combination of the outputs of the motion sensor(s) 203, for instance a motion pattern indicative of a typical human hand operation and data acquired from a potential external wirelessly controllable apparatus during an interrogation session. In such embodiments, after a certain human routine limb motion is detected a communication protocol for the interrogation session is selected, optionally similarly to the described below. The interrogation session is used to detect which function is currently man operated on the potential external wirelessly controllable apparatus, for example which application currently has an active, for example rendered, graphical user interface (GUI). This allows selecting a communication protocol which is suitable for communicating with the currently executed and operated function. In such a manner, the selected communication protocol may be adapted for a certain application, for instance for a currently running game and/or a currently running word processing application and/or a currently running authentication application.

Optionally, the categorization differentiates between different man operated devices, for example between a laptop and a Smartphone or a tablet. Optionally, the categorization differentiates between applications running on the same man operated device, for example between a word processor and a game application. In such embodiments, different communication protocols may be different sets of instructions to operate different applications hosted on the same device. In such a manner, user inputs to different applications may be forwarded using the same communication channel based on a detection of a current human routine limb motion.

Optionally, as shown at 103A, a user interface, such as a graphical user interface, presented by the MMI 205, for example a touch screen, is adapted or replaced according to the selected communication protocol. In such embodiments, each communication protocol defines UI defining instructions, for instance for converting buttons to instructions and/or GUI rendering instructions. For example, a user interface for operating one wirelessly controllable apparatus, such as an application running on a personal computer, is replaced with a user interface for operating another wirelessly controllable apparatus, for instance an infotainment system of a vehicle. The replaceable user interfaces may set a common user input detection mechanism, for example one or more buttons located about the same location in a presentation on a touch screen. In such a manner, the user who clicks or touches on the MMI 205 does not have to look on the MMI before inputting the user input by a click or a finger touch.

Now, as shown at 104, a user input performed by the wearing user using the MMI 205 is detected. The user input may be a click of a button, a data input gesture made with the limb on which the limb worn device 200 is worn, a touch screen click or slide, a voice commend, a detector input and/or the like.

For example, the user input is an extension of a screen, a mouse, a keyboard and/or any accessory of the man operated device. Optionally, the user input is conditioned. In such a manner, the outcome of the user input may be determined on the application which is currently running on the man operated device, the user who wears the limb worn device 200, the time of the day, the state of the man operated device and/or a combination thereof. Optionally, the user input includes instructions to run and/or launch a certain application. Optionally, the user input is part of a hierarchical activation, for example a presentation of a menu of a GUI, a selection of a menu in GUI, a part of sequence of inputs which form an instruction, and/or the like. Optionally, the user input is application state dependent, for instance varies between select, copy, paste, change language, and/or insert image based on the state of a word processing application and/or varies between send, add an attachment, browse to the next/previous email based on the state of a mail management application.

Optionally, the user input is indicative of instructions to trigger a switch between applications, for instance can be used to choose what program runs on tablet.

Optionally, the user input is indicative of instructions to operate a wirelessly controllable apparatus such as an alarm system, for instance to deactivate an alarm system when a key turning operation is identified.

Optionally, the user input is indicative of instructions to control a playing of media content presented on a display of the wirelessly controllable apparatus 202, for instance a video or audio stream or file.

Optionally, the user input is indicative of instructions to switch between applications, for instance can be used to choose what program runs on tablet.

Optionally, the user input is indicative of instructions to operate an alarm system, for instance to deactivate an alarm system when a key turning operation is identified.

Optionally, the user input is indicative of instructions to operate a head mounted display, such as Google glass, for instance to instructions to select a displayed item.

Optionally, as shown at 105, the selection of the communication protocol and/or the detection of the user input trigger the establishment of a communication channel between the limb worn device 200 and the external wirelessly controllable apparatus 202. The establishment may involve pairing the limb worn device 200 with a wirelessly controllable apparatus which is operated according to the selected communication protocol. For example, the pairing may be performed according to a Bluetooth™ protocol, optionally using pairing definitions set in advance for the limb worn device 200 pairing, for instance predefined password. The establishment may be over an internet connection, such as a TCP/IP connection over the web, for instance via a proxy or a server or directly (see also definitions above). The establishment may involve disconnecting the limb worn device 200 from a currently paired wirelessly controllable apparatus device and pairing the limb worn device 200 to another wirelessly controllable apparatus which is operated according to the selected communication protocol. The establishment may trigger the performing of an authentication procedure, such as a Global System for Mobile Communications (GSM) authentication performed by the limb worn device 200 or the wirelessly controllable apparatus to which it is connected.

Now, as shown at 106, a message indicative of operation instructions to operate a function executed by a processor of the wirelessly controllable apparatus that is related to the selected communication protocol is automatically generated, for instance encoded by a message encoder based on the detected user input. As shown at 107, the message is automatically transmitted over wireless network connection(s) to one or more plurality of wirelessly controllable apparatuses which are set to receive messages encoded according to the selected communication protocol. These wirelessly controllable apparatuses are preferably currently used by the user and/or located in proximity thereof to assist in an operation he is currently performs.

In one example, a detection of a human routine limb motion such as operating a cursor leads to the selection of a communication protocol for communicating with a laptop. The selection triggers automatic paring of the limb worn device 200 to the Bluetooth™ module or Wi-Fi module of the laptop and the detection of the input performed by the wearing user using the MMI 205 triggers operating a function of operating a software executed on the personal computer and defined in the selected protocol, for instance performing a cursor selection, marking an area around the cursor, and/or triggering the operation of a software executed on the personal computer.

In one example, a detection of a human routine limb motion such as driving leads to the selection of a communication protocol for communicating with a Bluetooth™ speaker. The selection triggers automatic paring of the limb worn device 200 to the Bluetooth™ speaker and the detection of the input performed by the wearing user using the MMI 205 triggers operating a function of the Bluetooth™ speaker using the selected protocol.

In another example, a detection of a human routine limb motion such as typing leads to the selection of a communication protocol for communicating with a personal computer which runs a word processor. The selection triggers automatic disconnection of the limb worn device 200 from a Smartphone and the pairing of the limb worn device 200 to the personal computer and the detection of the input performed by the wearing user using the MMI 205 triggers operating a keyboard function using the selected protocol.

According to some embodiments of the present invention, the user input that is provided by the MMI 205 is used for authenticating the user. In such embodiments, detection of a human routine limb motion such as typing or using a cellular phone for talking or texting leads to the selection of a communication protocol for communicating with a personal computer or a Smartphone which runs n authentication function. The selection triggers automatic paring of the limb worn device 200 to the personal computer or Smartphone and the received user input is analyzed to authenticate the user. In such embodiments, the user input may be a signature fingertip slide on a touch screen, a signature fingertip click pattern on a touch screen, and/or a biometric data that is encoded in the user input, for instance when the MMI includes a fingerprint reader and the fingerprint reader is a fingertip.

Optionally, as shown at 108, outputs of the motion sensors 203 are continually or iteratively monitored to detect and categorize current human routine limb motions, facilitating a continuous and/or iterative reselection of communication protocols to transmit messages triggered by a user input detected by the MMI 205, with or without reestablishment of communication channels with different external wirelessly controllable apparatuses, for instance by repairing. In such embodiments, different messages according to different communication protocols, are triggered by the same MMI operation, and optionally sent via different communication channels.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term an MMI, a UI, a GUI, and a wirelessly controllable apparatus is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of changing communication protocols to encode messages wirelessly transmitted from limb worn devices to wirelessly controllable apparatuses, comprising:

continually or iteratively monitoring outputs of at least one motion sensor installed in a limb worn device having a man machine interface (MMI) while said limb worn device is worn by a user and communicates to one of a plurality of wirelessly controllable apparatuses according to one of a plurality of communication protocols;

analyzing said outputs to detect a human routine limb motion performed by said user wearing said limb worn device while said user operates said one of said plurality of wirelessly controllable apparatuses and wears said limb worn device on a limb;

in response to said detection of said human routine limb motion automatically changing for an operation period, according to said detected human routine limb motion, from said one of said plurality of communication protocols to another of said plurality of communication protocols where each communication protocol from said plurality of communication protocols is used by said limb worn device to forward instructions triggered by a common user input made using said MMI for operating one of said plurality of wirelessly controllable apparatuses;

automatically detecting when said common user input is performed by said user using said MMI during said operation period; and in response to said detecting, wirelessly and automatically transmitting a message indicative of operation instructions to operate a function executed by a processor associated with another wirelessly controllable apparatus of said plurality of wirelessly controllable apparatuses and correlated with said user input, said message being transmitted according to said another communication protocol from said limb worn device to one of said plurality of wirelessly controllable apparatuses.

2. The method of claim 1, further comprising automatically adapting a user interface presented by said MMI during said operation period according to said another of said plurality of communication protocols.

3. The method of claim 1, wherein said message comprises authentication data for authenticating said user.

4. The method of claim 1, wherein said operation period is shorter than 5 minutes.

5. The method of claim 1, wherein said processor is of said another of said plurality of wirelessly controllable apparatuses.

6. The method of claim 1, wherein said processor is of an accessory of said another of said plurality of wirelessly controllable apparatuses.

7. The method of claim 1, wherein said automatically changing comprises disconnecting an existing communication channel which allows said limb worn device to send said another of said plurality of wirelessly controllable apparatuses messages encoded according to said another of said plurality of communication protocols and establishing a new communication channel to send said message therethrough.

8. The method of claim 7, wherein said establishing comprises automatically performing a pairing of said limb worn device with said another of said plurality of wirelessly controllable apparatuses.

9. The method of claim 1, wherein said function is a text processing function for editing text presented on a display of said plurality of wirelessly controllable apparatuses.

10. The method of claim 1, wherein said function is a media playing operation function for controlling a playing of media content presented on a display of said another of said plurality of wirelessly controllable apparatuses.

11. The method of claim 1, wherein said one of said plurality of communication protocols is a communication protocol to communicate with a computing unit connected to an external keyboard and said another of said plurality of communication protocols is a communication protocol to communicate with a touch screen operated computing unit.

12. The method of claim 1, wherein said another of said plurality of communication protocols defines instructions to send messages selected from the following messages type: keyboard input instructions, mouse input instructions, touch screen input instructions, and television remote control instructions.

13. The method of claim 1, wherein said at least one motion sensor comprises at least one of an accelerometer and a gyro.

14. The method of claim 1, wherein said limb worn device is a watch having a touch screen as said MMI; said user input is a touch event detected on said touch screen; wherein said touch event is a finger touch or a finger slide on said touch screen.

15. The method of claim 1, wherein said detected human routine limb motion is typing and said message is indicative of a keyboard input to an application currently running on said another of said plurality of wirelessly controllable apparatuses.

16. The method of claim 1, wherein said detected human routine limb motion is cursor maneuvering and said message is indicative of an editing operation to edit an object pointed by a cursor and presented by an application currently running on said another of said plurality wirelessly controllable apparatuses.

17. The method of claim 1, wherein said detected human routine limb motion is steering wheel maneuvering and said message is indicative of a vehicle function operation and said processor is of a system installed in a vehicle.

18. The method of claim 1, wherein said plurality of communication protocols comprises a word processor communication protocol to communicate with a computing unit running a word processor and a cellular phone communication protocol to communicate with a cellular phone such that when said another of said plurality of communication protocols is said word processor communication protocol said operation instructions instructs said word processor and when said another of said plurality of communication protocols is said cellular phone communication protocol said operation instructions instructs said cellular phone to perform a wireless interpersonal communication related operation.

19. A limb worn device, comprising:
a housing sized and shaped to be worn on a limb of a user;
at least one motion sensor mounted in said housing to detect a motion of said limb;
a man machine interface (MMI);
at least one hardware processor which executes a code for:
continually or iteratively monitoring outputs of said at least one motion sensor while said limb worn device communicates with one of a plurality of wirelessly controllable apparatuses according to one of a plurality of communication protocols,
analyzing said outputs to detect a current human routine limb motion performed by said user while said user operates said one of said plurality of wirelessly controllable apparatuses, and
automatically changing, in response to said detection of said human routine limb motion and according to said detected human routine limb motion, from said one of said plurality of communication protocols to another of said plurality of communication protocols where each communication protocol from said plurality of communication protocols is set used by said limb worn device to forward instructions triggered by a common user input made using said MMI for operating another of said plurality of wirelessly controllable apparatuses, and
detecting when said common user input is performed by said user using said MMI after said at least one hardware processor performs said change; and
a wireless transmitter which transmits, to said another wirelessly controllable apparatus in response to said detection of said user input, a message encoded according to said another communication protocol to indicate operation instructions to operate a function executed by a processor of said another of said plurality of wirelessly controllable apparatuses.

20. A system of establishing communication channels with different wirelessly controllable apparatuses for entering user inputs, comprising:
a housing sized and shaped to be worn on a limb of a user;
at least one motion sensor mounted in said housing;
a man machine interface (MMI) mounted in said housing;
a memory for storing communication instructions for communicating with a plurality of wirelessly controllable apparatuses according to a plurality of communication protocols used to forward instructions triggered by a common user input to said MMI for operating one of said plurality of wirelessly controllable apparatuses;
at least one hardware processor which executes a code for:
continually or iteratively monitoring outputs of said at least one motion sensor while said system communicates with one of a plurality of wirelessly controllable apparatuses according to one of a plurality of communication protocols,
analyzing said outputs to detect a human routine limb motion performed by said user while said user operates said one of said plurality of wirelessly controllable apparatuses,
automatically changing, in response to said detection and according to said detected human routine limb motion from said one of said plurality of communication protocols to another of said plurality of communication protocols, detecting when said common user input performed by said user using said MMI after said change, and generating a message indicative of operation instructions to operate a function executed by a processor of said another of said plurality of wirelessly controllable apparatuses according to said another communication protocol; and a wireless transmitter which transmits said message over a wireless network connection to said another wirelessly controllable apparatus in response to said detection of said user input.

\* \* \* \* \*